United States Patent [19]

Baars

[11] 3,750,029

[45] July 31, 1973

[54] TELEVISION RECEIVER

[75] Inventor: Nicolaas Joris Baars, Emmasingel, Eindhoven, Netherlands

[73] Assignee: U.S. Philips Corporation, New York, N.Y.

[22] Filed: Nov. 2, 1971

[21] Appl. No.: 194,818

[30] Foreign Application Priority Data

Nov. 21, 1970 Netherlands ........................ 7017068

[52] U.S. Cl. .............................. 325/420, 178/7.3 R

[51] Int. Cl. ............................................. H04b 1/16

[58] Field of Search .................... 325/346, 349, 416, 325/417, 418, 419, 420–423; 178/7.3, 7.5

[56] References Cited

UNITED STATES PATENTS 3,189,825 6/1965 Lahti et al. ......................... 325/423

3,428,900 2/1969 Newton .............................. 325/346

*Primary Examiner*—Richard Murray

*Attorney*—Frank R. Trifari

[57] ABSTRACT

In a television receiver employing a synchronous demodulator for the intermediate frequency signal and an intermediate frequency picture carrier oscillator coupled thereto a frequency control signal is obtained from a phase detector active on the intermediate picture frequency and is applied via a highpass filter to the intermediate frequency picture carrier oscillator and via a lowpass filter to the oscillator of the mixer stage of the receiver.

9 Claims, 1 Drawing Figure

PATENTED JUL 31 1973 3,750,029
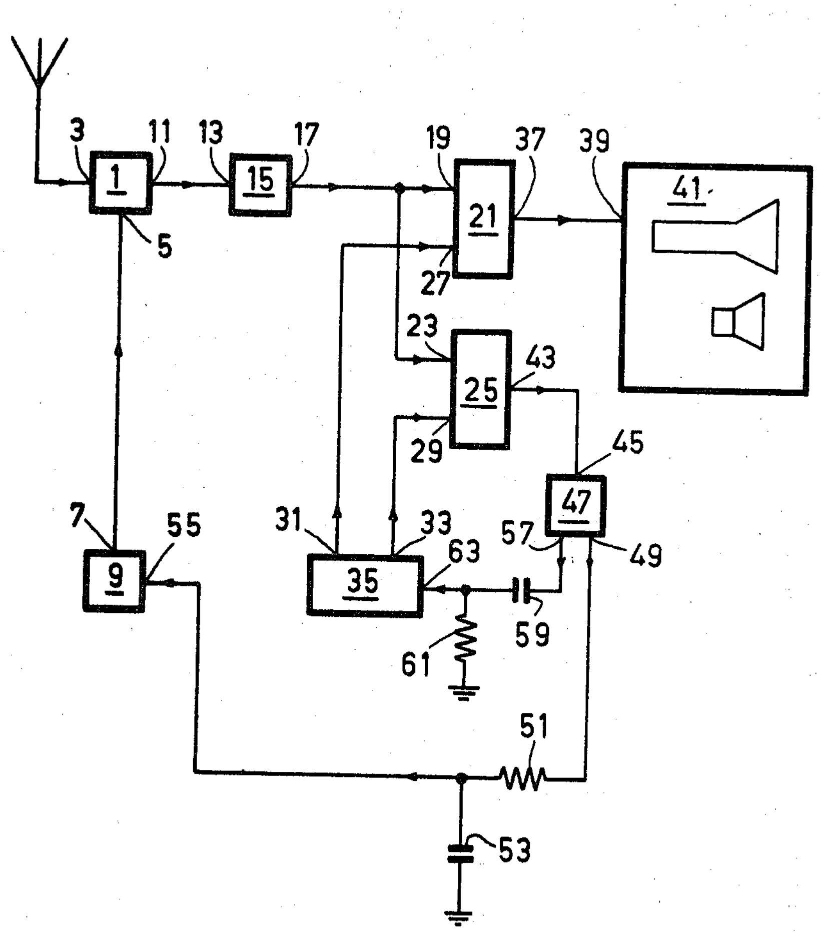
INVENTOR.
NICOLAAS J. BAARS
BY
AGENT

TELEVISION RECEIVER

The invention relates to a television receiver including an oscillator coupled to a mixer stage, at least one intermediate frequency amplifier coupled to an output of the mixer stage, a detector coupled to an output of the I.F. amplifier, which detector is furthermore coupled to an output of an intermediate frequency picture carrier signal generator, an output of said detector being coupled to a control signal input of a frequency control circuit coupled to the oscillator.

Such a television receiver is known from Convention Record of the I.R.E. Wescon, part 7, 1957, page 27–35.

It has been found that in such a circuit it is difficult to obviate possible and especially rapidly changing phase errors between a received modulated intermediate frequency picture carrier signal and an unmodulated carrier signal generated by the intermediate frequency picture carrier signal generator.

An object of the present invention is to greatly reduce this unwanted phenomena.

To this end a television receiver of the kind described in the preamble according to the invention is characterized in that an output of the detector is coupled at least through a high pass filter to a control signal input of a further frequency control circuit coupled to the intermediate frequency picture carrier signal generator.

It has been found that due to this step a control system is obtained which can provide an extremely rapid compensation of phase errors while due to the absence of a control of the mean frequency of the intermediate frequency picture carrier signal generator the location of an intermediate frequency spectrum obtained from a received signal relative to the bandpass curve of the I.F. amplifier substantially only depends on the adjustment and the stability of the picure carrier signal generator relative to the rest of the I.F. section of the receiver, which does not cause any difficulties.

In order that the invention may be readily carried into effect an embodiment thereof will now be described in detail by way of example with reference to the accompanying diagrammatic drawing the sole FIGURE of which shows a non-detailed block diagram of a television receiver according to the invention.

In the FIGURE a mixer stage 1 has an input 3 to which a received television signal can be applied. Furthermore the mixer stage 1 has an input 5 which is connected to an output 7 of an oscillator 9.

An output 11 of the mixer stage 1 is connected to an input 13 of an intermediate frequency amplifier 15. An output 17 of I.F. amplifier 15 is connected to an input 19 of a synchronous detector 21 as well as to an input 23 of a detector 25.

The detector 25 may be a phase detector or a combination of a phase and a frequency detector.

A further input 27 of the synchronous detector 21 and a further input 29 of the detector 25 are connected to outputs 31 and 33, respectively, of an intermediate frequency picture carrier signal generator 35.

An output 37 of the synchronous detector 21 is connected to an input 39 of a sound and picture display section 41. The synchronous detector 21 provides a synchronously demodulated and hence a composite television signal of little distortion to the display section, which television signal can be split up in the required components and displayed.

The detector 25 has an output 43 which provides a voltage or current to an input 45 of an amplifier circuit 47, which voltage or current depends on the mutual phase deviation of the signals at its inputs 23 and 29.

The amplifier circuit 47 has a first output 49 which is connected through a low pass filter 51, 53 to a control signal input 55 of the oscillator 9. The oscillator 9 has a frequency control circuit (not shown) which is coupled to the control signal input 55 and is therefore incorporated in a control loop which attempts to maintain the intermediate frequency of the received signal constant and which prevents slow variations of the frequency and the phase of the intermediate frequency signal.

Furthermore the amplifier circuit 47 has a second output 57 which is connected through a highpass filter 59, 61 to a control signal input 63 of the intermediate frequency picture carrier signal generator 35. This generator 35 has a further frequency control circuit (not shown) which is coupled to the control signal input 67 and is thus incorporated in a control loop which reconcontrols the phase of the signals provided by the generator 35 in case of rapid phase variations of the intermediate frequency signal.

The cut-off frequencies or time constants of the highpass and lowpass filters 59, 61 and 51,53 are preferably chosen to be substantially equal, and the transmission factor from the input 45 to the output 49 of the amplifier circuit 47 is preferably chosen to be different from that from the input 45 to the second output 57 in such a manner that the loop amplifications of the two control loops are substantially equal.

As a result of the highpass filter 59, 61 in the control loop including the intermediate frequency picture carrier generator 35 the average location of the intermediate frequency spectrum relative to the bandpass curve of the I.F. amplifier cannot be influenced by this control loop so that problems which might be caused by an erroneous location cannot occur.

Since the last-mentioned control loop contains few components, it can be readily made suitable for very rapid phase compensations without instabilities occurring.

Highpass and/or lowpass filters other than the simple RC filters of the embodiment may of course alternatively be used, although considerations of stability may make the mentioned simple filters attractive.

A favourable choice of the cut-off frequency of the filters is found to be approximately 100 Hertz.

I claim:

1. A circuit for receiving a signal having a carrier, said circuit comprising a mixer having a first input adapted to receive said signal, a second input, and an output means for providing said signal at an intermediate frequency; an oscillator having an output coupled to said mixer second input and a frequency control input; a phase detector having a first input coupled to said mixer output, a second input, and an output coupled to said oscillator control input; means for generating a signal having a frequency equal the carrier intermediate frequency having an output coupled to said detector second input and a frequency control input; and a high pass filter coupled between said detector output and said generator control input.

2. A circuit as claimed in claim 5 further comprising a low pass filter coupled between said detector output and said oscillator control input.

3. A circuit as claimed in claim 2 wherein said filters have substantially equal cut off frequencies.

4. A circuit as claimed in claim 3 wherein said cut off frequencies equal one hundred Hertz.

5. A circuit as claimed in claim 2 wherein said low and high pass filters each comprise resistor-capacitor integrator and differentiator respectively.

6. A circuit as claimed in claim 5 wherein said differentiator and integrator have substantially equal time constants.

7. A circuit as claimed in claim 1 wherein said oscillator, mixer, and detector comprise a first frequency control loop; said generator, detector, and high pass filter comprise a second frequency control loop; the loop gains of said loops being substantially equal.

8. A circuit as claimed in claim 1 further comprising an intermediate frequency amplifier coupled between said mixer output and said detector first input.

9. A circuit as claimed in claim 1 further comprising a synchronous detector having a first input coupled to said mixer output, and second input coupled to said generator output, and an output means for providing a detected signal.

* * * * *